INVENTOR.
FRANK R. TOLES

United States Patent Office 3,454,121
Patented July 8, 1969

3,454,121
DRIVE CONTROL FOR CONSTRUCTION MACHINES
Frank R. Toles, Highland, Calif., assignor to Gordon H. Ball, Inc., Danville, Calif., a corporation of Nevada
Filed Aug. 3, 1967, Ser. No. 658,205
Int. Cl. B62d *11/04*
U.S. Cl. 180—6.48                              3 Claims

ABSTRACT OF THE DISCLOSURE

A construction machine having two driving trucks driven by hydraulic motors, the pumps associated therewith having movable control rods to control the speed of the motors. The speed of the trucks is varied differentially with the speed of one truck being increased while simultaneously the speed of the other truck is decreased by a cross beam which is coupled between the control rods. The overall speed of the paving machine is controlled by a londitudinal beam coupled to the crossbeam which causes a simultaneous change of speed in the same direction. An alternative embodiment utilizes control pulleys in place of the beam.

---

Figure 1:
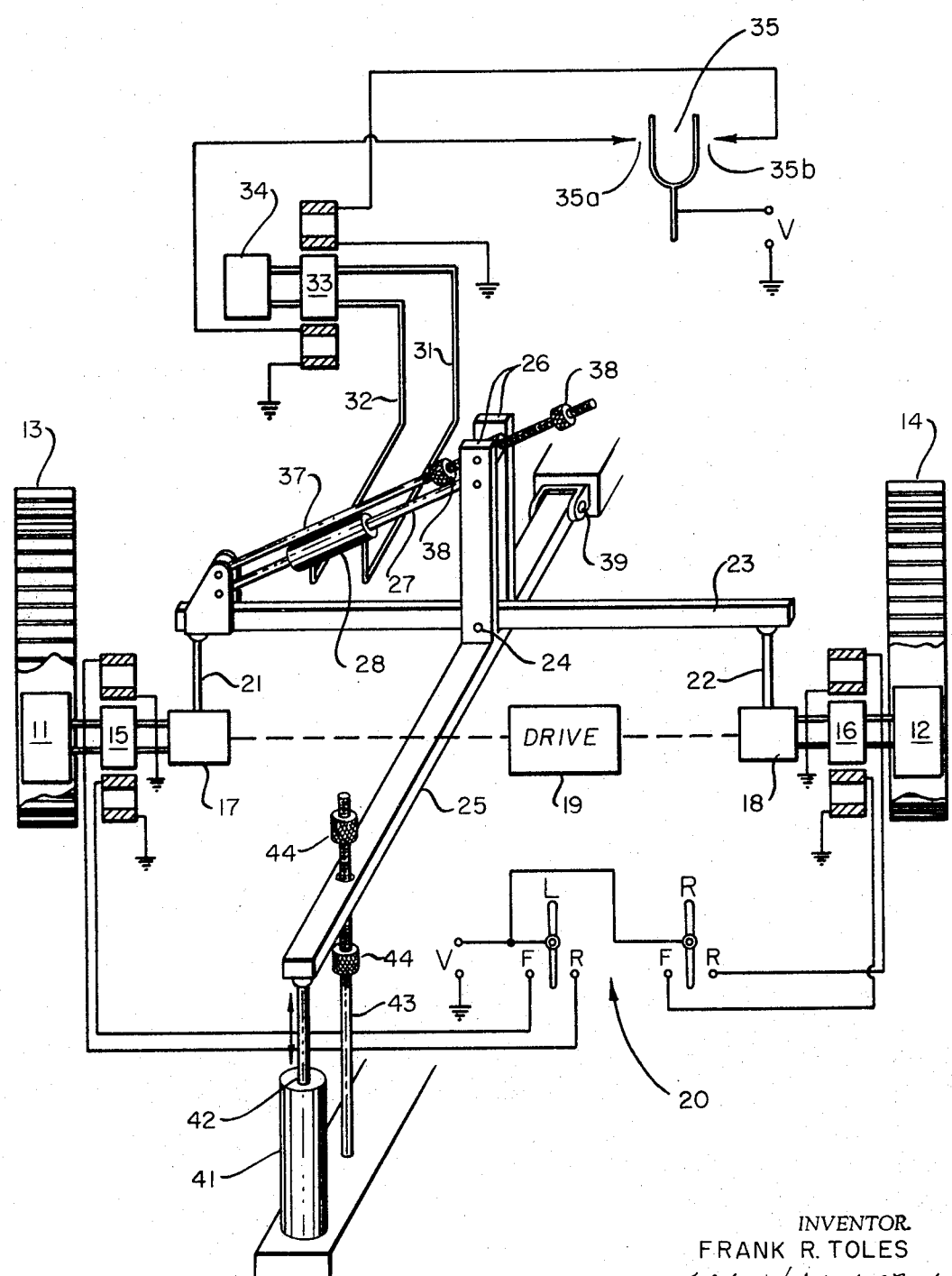

This invention relates generally to a drive control for construction machines and more particularly to a drive control which is especially adapted for automatic operation.

Construction machines for paving roadways, canal linings and the like are well known. In general, these pavers are provided with spaced motor driven trucks connected to the sides of the paving machine. The trucks are under the control of a guide wire which is stretched along the surface to be paved. When the machine departs from the line of travel defined by the guide wire, one or the other of the two trucks is reduced in speed to negotiate the turn. In fact, one truck usually has its motive power reduced to zero.

Some systems which have been developed in the past have used electric motors for driving the trucks. See, for example, Patent No. 2,907,398 granted to R. M. Guntert et al., Oct. 6, 1959 and entitled "Supporting, Driving, and Steering Mechanism for Slab Laying Machines." Others have employed hydraulic motors.

It is an object of the present invention to provide an improved drive control of the above type which is simple and more effective than prior systems.

It is another object of the present invention to provide a drive control system in which the drive motors are differentially controlled.

In accordance with the above objects there is provided a construction machine of the type having two driving trucks where each truck is respectively coupled to first and second motor means. Each of the motor means has a control input for selectively changing the speed of its associated driving truck. First control means are coupled to both of the control inputs for differentially varying the truck speeds by increasing the speed of one truck while concurrently decreasing the speed of the other truck. Second control means are also coupled to the control input for simultaneously proportionately either increasing or decreasing the speed of both of the trucks to maintain the same differential speed variation.

The foregoing and other objects of the invention will become more clearly apparent from the following description taken in conjunction with the accompanying drawings.

Figure 2:
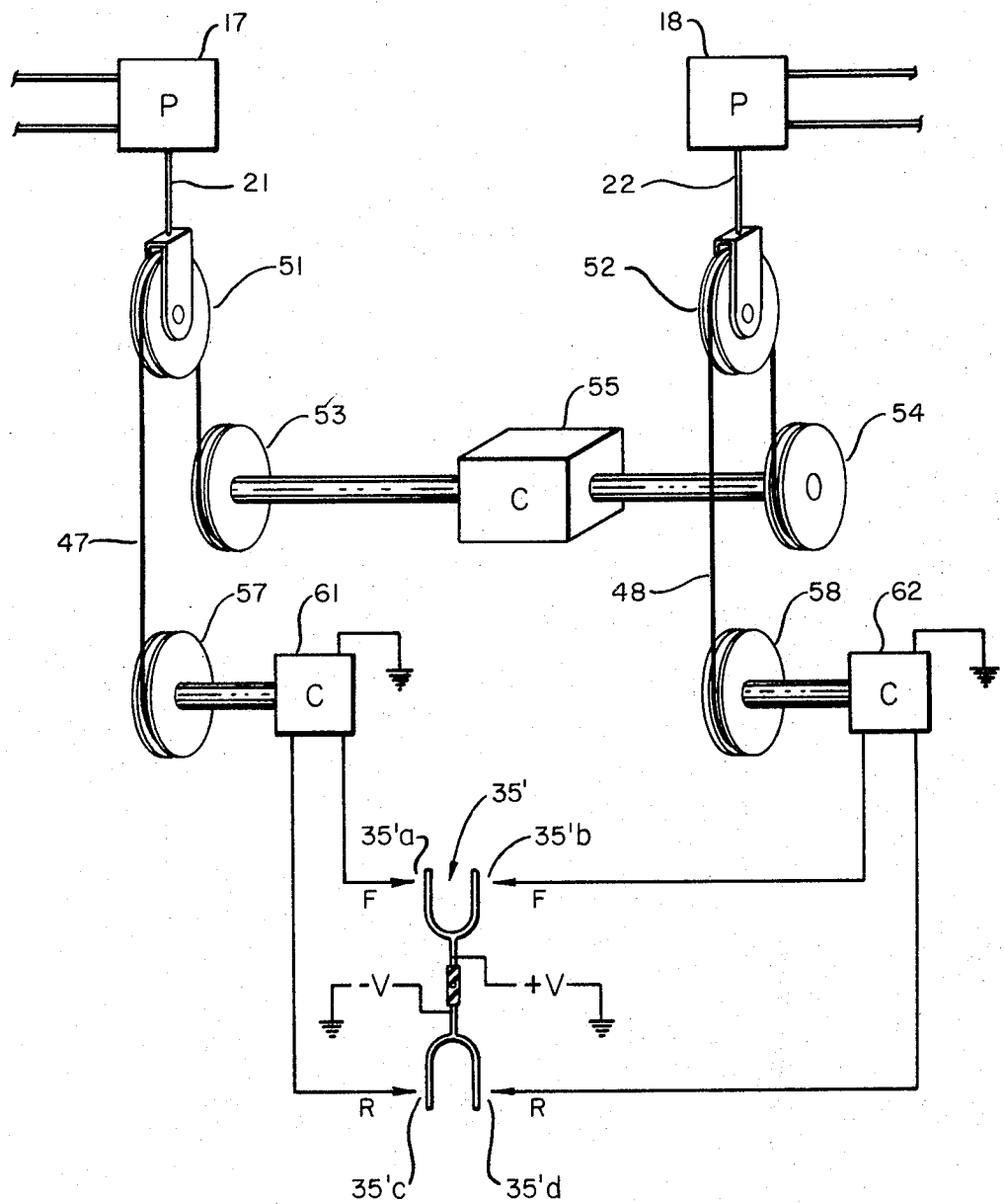

Referring to the drawings:

FIGURE 1 is a simplified perspective and schematic of the construction machine embodying the present invention; and FIGURE 2 is a simplified schematic of a modification of FIGURE 1.

Referring now to FIGURE 1, two hydraulic motors 11 and 12 drive the left and right tracks 13 and 14 of the paving machine. The details of the paving machine are not illustrated since the structure of such machines is well known in the art. The motors 11 and 12 are connected by four-way solenoid valves 15 and 16 to variable positive displacement pumps 17 and 18, respectively. Pumps 17 and 18 are driven by a common drive 19 which may be, for example, a diesel engine mounted on the paver. The amount of hydraulic fluid which is pumped is dependent upon the position of associated control rods 21 and 22 which are associated with pumps 17 and 18, respectively. Thus, the control rods 21 and 22 serve as control inputs for selectively varying the amount of fluid to the associated motors thereby changing the speed of the associated driving trucks.

The direction of movement is controlled by four-way solenoid valves 15 and 16 which are coupled to a direction switch 20 having individual switches L and R for control of the left and right tracks 13 and 14, respectively. The switch, as shown, is in the neutral position. The valves are in a condition where no fluid is supplied to motors 11 and 12 and the paver is at a standstill. With either of the switches in an "F" or forward position, the associated motor is driven in the forward direction, and similarly with either of the switches moved to the "R" or reverse position, the associated paver motor is driven in the opposite direction.

In order to differentially vary each track speed, that is, while increasing the speed of one track the speed of the other is decreased, first control means are provided which are coupled to control the rods 21 and 22.

The specific mechanism for this purpose includes a crossbeam 23 having a ball joint connection at its ends with rods 21 and 22. The crossbeam is pivoted on pin 24 mounted on a pair of spaced members 26 secured to beam 25. The upper ends of the braces are adapted to receive an actuator 27 of a hydraulic ram 28. The ram has its other end connected to crossbeam 23.

Operation of the ram serves to pivot the crossbeam 23 about pin 24 and longitudinal beam 25 and, since the axis is located intermediate the control rods 21 and 22, the ends of the rods are moved in opposite directions to produce a differential speed variation. This, in turn, causes the paving machine to turn in one direction or the other.

Hydraulic ram 28 is actuated through lines 31 and 32 connected to a four-way solenoid valve 33. Valve 33, in turn, is coupled to a fluid pump 34 which may be driven from drive means 19 if convenient, or from a separate means. Four-way valve 33 is coupled to a sensing switch 35 which is adapted to ride on the guide wire of the paving machine. As more fully discussed in the above mentioned Guntert patent application, automatic control of the direction of the machine is provided by following a wire which is straddled from above by a pronglike probe or feeler coupled to switch 35. When the machine deviates from its predetermined course, either switch 35a or 35b is closed. This applies fluid pressure through either lines 31 or 32 to cause crossbeam 23 to be actuated by ram 28 to pivot either in a clockwise or counter-clockwise direction about the pin 24. This speeds up one truck and slows down the other providing steering to the left or right. It is apparent that when the machine is on course the switch 35 will return to its neutral position as shown.

The travel of ram 28 is limited with an attendant limitation in the differential speed control by a threaded rod 37 which is located parallel to ram 28 and actuator rod 27 and has one end pivoted on beam 23 and the other extending through and between braces 26. Double nut stops 38 mounted on the threaded portion of the rod limit the travel of the ram and, therefore, the maximum differential in speed.

Second control means are coupled to control rods 21 and 22 for simultaneously increasing or decreasing the speed of both of the tracks 11 or 12 by identical movement while maintaining the differential speed, if any, produced by crossbeam 23. More specifically, speed control or longitudinal beam 25 is pivoted on pin 39 which is mounted on the ears 40 secured to the paver. This axis is perpendicular to axis 24. Thus, since beam 25 serves as a platform for axis 24 and beam 23, movement of speed control beam 25 in an up or down direction moves both control rods 21 and 22 in a similar direction to change the speed of both tracks in an identical manner. Moreover, any differential speed is maintained. Actuating means for moving beam 25 include a ram 41 affixed to the main structure of the paver and an actuator 42 extending from the ram coupled to the end of beam 25 by a ball joint connection.

As in the case of ram 28, the travel of ram 41 and actuator rod 42 is limited by a threaded rod 43 extending through beam 25 on which are mounted stops 44. Actuation of ram 41 would be controlled by some manual control means (not shown) convenient to the operator of the paving machine.

In operation, when the guide wire sensing switch 35 is rotated, its actuator ram 28 pivots differential control beam 23. This reduces the amount of hydraulic fluid pumped to one of the motors and increases the amount of fluid pumped to the other motor by the variable pumps 17 and 18, thereby allowing one track to speed up and the other track to slow down. If it is desired to control the speed of the entire machine, either when it is going in a straight line forward or around a curve, ram 41 is actuated to increase or decrease the speed as desired. This speed change will be identical for both tracks.

FIGURE 2 illustrates a modification of FIGURE 1 which includes the identical pumps 17 and 18 with control rods 21 and 22. However, the control means for rods 21 and 22 have been modified. More specifically, coupled to the ends of rods 21 and 22 are pulleys or sprockets 51 and 52. Because of the nature of pumps 17 and 18, control rods 21 and 22 are biased toward the pump direction and this bias is opposed in the opposite direction by the ropes or chains 47 and 48 placed on pulleys 51 and 52. Each end of ropes 47 and 48 is coupled to a fixed pulley; in the case of one end, pulleys 53 and 54, and in the case of the other, pulleys 57 and 58. These pulleys are, in essence, winding drums with pulleys 51 and 52 being a movable idler pulley. Pulleys 53 and 54 provide for unitary speed control of the paving machine and are coupled to a common drive 55 which rotates both pulleys in the same direction to cause a simultaneous speed change in the same direction for both tracks.

Pulleys 57 and 58 are the differential speed control pulleys and are coupled to separate driving means 61 and 62, respectively. These are preferably electric motors having a forward and reverse direction of rotation as indicated by the "F" and "R" leads. The leads terminate on a sensing switch 35' similar to sensing switch 35 but which contains an extra pair of contacts 35'c and 35'd. The lower portion of the switch having conducts "c" and "d" for its movable element is coupled to a negative voltage source, and the upper portion with switch conducts "a" and "b" is coupled to a positive voltage source. Application of the respective negative and positive voltages causes motors 61 and 62 to rotate in one direction or the other.

In operation, switch 35' would straddle a sensing guide wire and movement of the switch to rotate in one direction will close switch 35'a and 35'd, for example. This, in turn, will cause motor 61 to rotate in one direction and motor 62 to rotate in the opposite direction to produce a differential speed adjustment in a manner similar to that of the embodiment of FIGURE 1.

Lastly, actuation of common control 55 will again produce an overall simultaneous change of speed speeding up or slowing down both tracks when the machine is going either in a straight line or around a curve.

The embodiments described have included hydraulic drive motors and means for controlling the fluid supplied thereto. It is apparent that electric motors of the variable speed type could be employed and that the paver applied thereto could be controlled as, for example, by varying rheostats with the crossbeam 23, to provide for differential speed control.

Thus, the present invention has provided an improved construction machine and drive means therefor which is simple in constructon and provides for effective automatic operation of the individual drive motors of its tracks.

I claim:

1. In a construction machine of the type having a guide wire sensing switch for providing an indication of the direction said machine is departing from the line of travel defined by said guide wire and having two driving trucks where each truck is respectively coupled to first and second motor means, each of said motor means having a control input in the form of spaced control rods for selectively changing the speed of its associated driving truck, first control means including first lever means coupling both of said control rods for differentially varying said truck speeds by increasing the speed of one truck while concurrently decreasing the speed of the other truck said first lever means being pivoted on a first axis intermediate said control rods, means responsive to said direction indication of said sensing switch for controllably rotating said lever means about said first axis whereby said differential speed control is achieved, and second control means coupled to said control inputs for simultaneously increasing or decreasing the speed of both said trucks by identical amounts while maintaining said differential speed variation.

2. A construction machine as in claim 1 where said second control means includes second lever means pivoted about a second axis perpendicular to said first axis of said first lever means, said second lever means providing a platform for said first axis whereby movement of said second lever means produces identical speed changes in both of said trucks.

3. A construction machine of the type having two driving trucks where each truck is respectively coupled to first and second motor means, each of said motor means having a control input for selectively changing the speed of its associated driving truck, said control inputs including spaced control rods, pulleys affixed to said rods, each of said rods being biased in a predetermined first direction, each of said pulleys and associated rods having a pulling force applied to it in a direction opposite said bias by a flexible line mounted on each of said pulleys and each line having two ends, one end being terminated on differential control pulleys, said first control means including drive means coupled to both of said differential pulleys for concurrently rotating said pulleys in opposite directions to cause one of the control rods to move in one direction and the other control rod to move in the other direction whereby a differential speed change is produced by increasing the speed of one truck while concurrently decreasing the speed of the other truck, and control means for rotating both of said unitary control pulleys in the same direction to cause simultaneous variation of the speed of both trucks by identical amounts while maintaining said differential speed variation.

References Cited

UNITED STATES PATENTS

| | | | |
|---|---|---|---|
| 644,853 | 3/1900 | Fahl | 180—6.5 X |
| 2,941,609 | 6/1960 | Bowers et al. | 180—6.48 |
| 3,323,607 | 6/1967 | Futamata | 180—6.48 |

LEO FRIAGLIA, *Primary Examiner.*

JOHN A. PEKAR, *Assistant Examiner.*

U.S. Cl. X.R.

180—79